(12) United States Patent  (10) Patent No.: US 8,682,696 B1
Shanmugam  (45) Date of Patent: Mar. 25, 2014

(54) HEALTHCARE CLAIMS NAVIGATOR

(75) Inventor: Elangovan Shanmugam, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 1059 days.

(21) Appl. No.: 11/948,594

(22) Filed: Nov. 30, 2007

(51) Int. Cl.
*G06Q 40/00* (2012.01)

(52) U.S. Cl.
USPC .................................. 705/4; 705/35

(58) Field of Classification Search
USPC .................................... 705/2–4, 35
See application file for complete search history.

(56) References Cited

U.S. PATENT DOCUMENTS

| | | | | |
|---|---|---|---|---|
| 5,070,452 | A * | 12/1991 | Doyle et al. | 705/2 |
| 5,835,897 | A * | 11/1998 | Dang | 705/2 |
| 5,845,254 | A * | 12/1998 | Lockwood et al. | 705/2 |
| 7,739,127 | B1 * | 6/2010 | Hall | 705/2 |
| 7,996,239 | B1 * | 8/2011 | Pellican et al. | 705/2 |
| 2002/0025797 | A1 * | 2/2002 | Joao et al. | 455/406 |
| 2003/0028402 | A1 * | 2/2003 | Ulrich et al. | 705/3 |
| 2004/0122706 | A1 * | 6/2004 | Walker et al. | 705/2 |
| 2004/0172313 | A1 * | 9/2004 | Stein et al. | 705/4 |
| 2005/0060205 | A1 * | 3/2005 | Woods et al. | 705/4 |
| 2005/0240447 | A1 * | 10/2005 | Kil et al. | 705/4 |
| 2006/0020495 | A1 * | 1/2006 | Baker et al. | 705/4 |
| 2006/0265249 | A1 * | 11/2006 | Follis et al. | 705/3 |
| 2007/0022000 | A1 * | 1/2007 | Bodart et al. | 705/10 |
| 2008/0059242 | A1 * | 3/2008 | Stanford | 705/3 |
| 2008/0114659 | A1 * | 5/2008 | Pitroda | 705/21 |
| 2009/0055224 | A1 * | 2/2009 | Kashyap et al. | 705/4 |
| 2010/0042440 | A1 * | 2/2010 | Joao | 705/3 |

* cited by examiner

*Primary Examiner* — Olabode Akintola
*Assistant Examiner* — Abhishek Vyas
(74) *Attorney, Agent, or Firm* — Hawley Troxell Ennis & Hawley LLP; Philip McKay; Sean P. Lewis

(57) ABSTRACT

A computing system implemented method, system and/or computer program product for visualizing healthcare or other transactional relationships is provided which allows a user to visually track in a graphical presentation all the transactions associated with a particular insurance claim, for example a cumulative payment. The graphical presentation further allows the user to select a particular claim record and display the associated financial transaction records as a chronologically arranged lineage of separately selectable waypoints.

12 Claims, 8 Drawing Sheets

HEALTHCARE CLAIMS NAVIGATOR

BACKGROUND

Tracking of payments made for medical, dental and other healthcare services can be exceedingly difficult and complex, particularly with respect to payments made by, or on behalf of, a patient. For example, a patient covered by a healthcare insurance policy may make a co-payment at the time a healthcare service is rendered. The co-payment may be paid by a variety methods including by check, cash, flexible spending account card, creditcard, debitcard, voucher, electronic funds transfer. Alternately, the patient may choose to wait for the healthcare insurance provider to pay the healthcare service providers' submitted claim and then reconcile the remaining balance with the healthcare service provider after the healthcare service provider has been paid by the healthcare insurance provider.

To further complicate payment tracking, a single insurance claim may be divided among several healthcare service providers. For example, a primary care physician (PCP) may prescribe medications, order diagnostic tests, recommend specific treatments, and/or refer the patient to a specialist. The specialist may order additional diagnostic tests such as X-rays, CT scans, MRI scans, laboratory tests, etc. to determine a proper course of treatment. In many instances, the patient pays for each of these services separately by one or more of the methods described above.

Typically, each healthcare service provider also submits a separate claim to the patient's healthcare insurance provider. Assuming there are no issues, for example, improper healthcare procedure coding errors, with the submitted claim(s), the healthcare insurance provider pays the submitted claims in due course. Often this process is mostly transparent to the patient until an explanation of benefits (EOB) arrives in the mail. An EOB generally provides information related to the submitted claim, such as dates of service, insurance coverage, payments made or denied, etc. However, many patients find EOBs difficult to understand.

On many occasions, the patient may also receive an invoice from one or more of the healthcare service providers stating that the healthcare insurance provider refused payment for a portion, or all of, the submitted claim(s). These refusals can occur for any of a multitude of reasons including, but not limited to: the patient not meeting an annual deductible limit; the services rendered by the healthcare service provider not being covered by the patient's healthcare insurance policy and/or healthcare insurance provider; improper procedure coding; an error on the part of the healthcare insurance provider, the healthcare service provider, and/or the patient; maximum allowed benefits having been exceeded; or any other reason deemed appropriate by the healthcare insurance provider.

To further exacerbate the situation, the EOBs often arrive before, or after, the healthcare service provider's invoice. Consequently, it is often difficult for a patient, a healthcare service provider, or a healthcare insurance provider, to effectively determine what transactions have transpired related to a particular healthcare event. Moreover, given the frequently long time spans between the rendering of healthcare services and receipt of EOBs and/or healthcare service provider invoices, the receipts initially received by the patient at the time the healthcare services were rendered are often misplaced, lost or discarded, by the time an issue arises, thus making resolution of a payment issue exceedingly difficult and often leaving the patient in the untenable position of having to rely on the records of the healthcare insurance provider and/or healthcare service provider to verify proper payment of claims, reimbursements and applicable policy considerations (e.g., deductibles.)

Accordingly, due to the potential number of separate transactions, extended time periods between the transactions and reports associated with transactions, differing payment methods, frequently incomprehensible explanation of benefits (EOBS), patients, healthcare service providers, and healthcare insurance providers alike are frequently frustrated by the difficulties presented in resolving discrepancies and/or payment matters.

SUMMARY

In accordance with one or more exemplary embodiments, a computing system implemented method and apparatus for visualizing healthcare transactional relationships includes a process for visualizing healthcare transactional relationships as a chronologically arranged lineage of separately selectable waypoints.

In one embodiment, to generate the waypoints, a plurality of healthcare claim records and financial transaction records are gathered from one or more data sources. In one embodiment, the data sources are local and/or remote to the computing system. In one embodiment, the data is stored locally, in another embodiment, the data is stored remotely, and in a third embodiment, the data is stored both locally and remotely.

In one embodiment, the process for visualizing healthcare transactional relationships organizes the gathered records in a listing of individually selectable claim records which may be displayed for user selection. In one embodiment, upon receipt of a user input representing a selection of a claim record from the listing of displayed claim records, the process for visualizing healthcare transactional relationships graphically displays the selected claim record and associated financial transaction record(s) as a chronologically arranged lineage of separately selectable waypoints.

In one embodiment, each displayed waypoint is associated with an initiating entity, for example, a patient, a healthcare service provider or a healthcare insurance provider. In addition, each waypoint may represent a specific type of transaction such as, but not limited to: a provider claim; a patient payment; a reimbursement submittal; a cumulative payment; a received reimbursement; and/or a claim reprocessing submittal. In one embodiment, to differentiate among the various types of transactions and initiating entities, the waypoints are graphically displayed using for example, symbology, color-coding, grayscale shading, inverse video and/or any combination thereof. In one embodiment a waypoint is visually differentiated from other waypoints when a discrepancy is determined to be present. In one embodiment, to assist the user in identifying a waypoint of interest, transaction summary information is provided with each waypoint.

In one embodiment, a particular waypoint is selected by a user to display additional transaction details specific to the selected waypoint. In one embodiment, at least some of the additionally displayed transaction details may be downloaded from a database or other data source. In one embodiment, to simplify user cognition of the displayed information, the lineage is displayed as a visually navigable trail, thread or map among the associated waypoints. In one embodiment, the user may toggle the graphical display of waypoints to a list of transactions display.

As discussed in more detail below, using the various exemplary embodiments, with little or no modification and/or user input, there is considerable flexibility, adaptability, and opportunity for customization to meet the specific needs of various users under numerous circumstances.

For example, a computing system implemented process for visualizing transactional relationships may be provided for more general situations involving insurance claim records.

In one embodiment, a computer implemented process is used to obtain one or more insurance claim records from one or more data sources. The process further organizes the one or more insurance claim records in a listing of individually selectable claim records which is displayed to a user as a listing of selectable claim records. Upon user selection of a claim record from the list, a graphical display of the selected claim record and any associated financial transaction records are visually output as a chronologically arranged lineage of selectable waypoints.

BRIEF DESCRIPTION OF THE DRAWINGS

The various inventive features, advantages and embodiments will become apparent from the following detailed description when considered in conjunction with the accompanying drawings. Where possible, the same reference numerals and characters are used to denote like features, elements, systems, components or portions thereof. It is intended that changes and modifications may be made to the described embodiment without departing from the true scope and spirit of the various inventive embodiments. A person having ordinary skill in the art will readily appreciate that the figures are examples and that other architectures, modes of operation, orders of operation, processing sequences and elements/functions may be provided and implemented without departing from the characteristics and features of the various inventive embodiments as set forth in the Claims.

DETAILED DESCRIPTION

Figure 1:
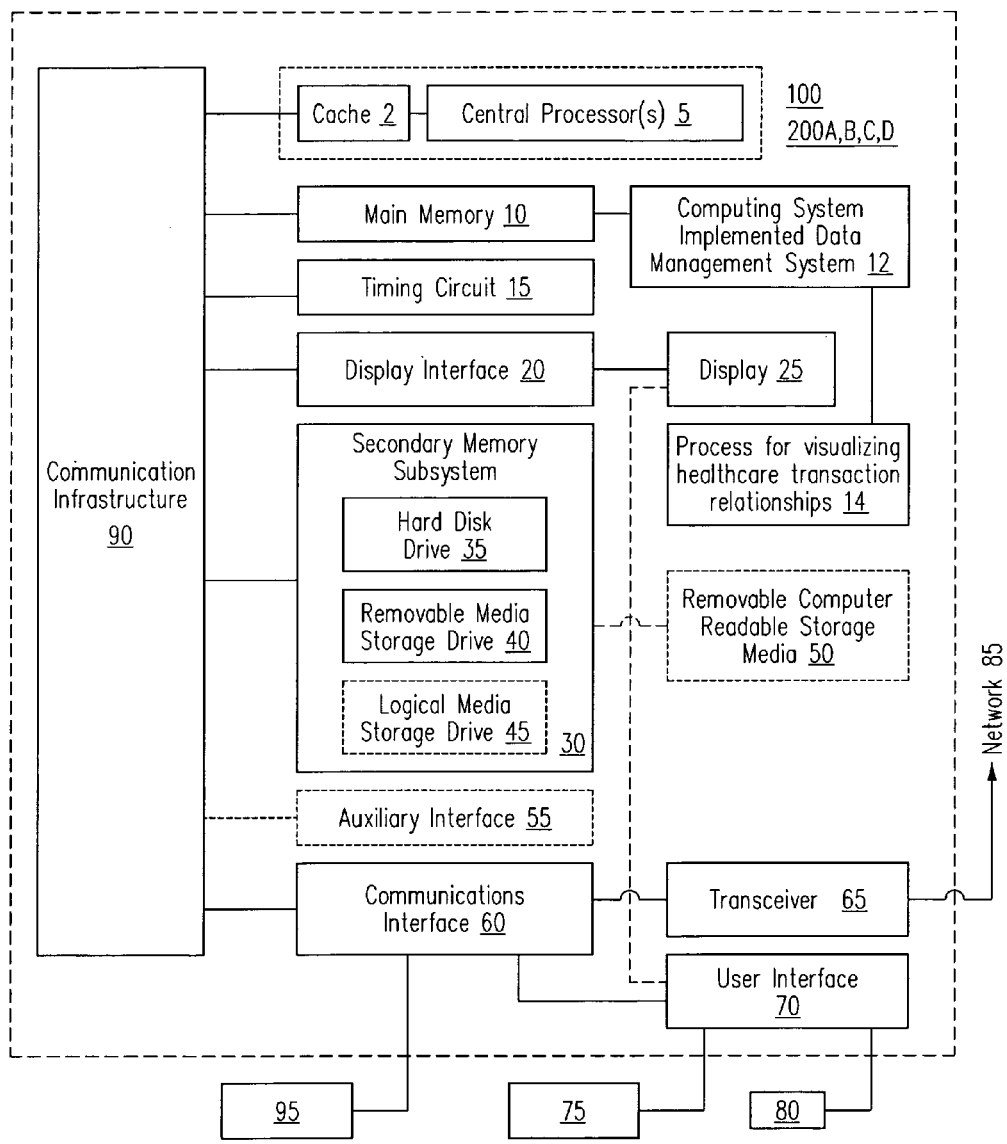
FIG. 1 is a block diagram of one embodiment of a computing system hardware architecture for implementing one or more of the inventive embodiments described herein.

Various inventive embodiments for visualizing healthcare transactional relationships are discussed with reference to the accompanying figures which depict one or more exemplary embodiments. Embodiments may be provided in many different forms and should not be construed as limited to the embodiments set forth herein, shown in the figures, and/or described below. Rather, these exemplary embodiments are provided to allow a complete disclosure that conveys the inventive principles and concepts, as set forth by the Claims, to those persons having ordinary skill in the art. In addition, the particular terminology used herein is likewise intended to be illustrative and exemplary only, and in no way limits the inventive scope as Claimed.

For illustrative purposes only, a computing system includes a process for visualizing healthcare transactional relationships implemented with and/or through any Computing System Implemented Data Management System. Herein, the term Computing System Implemented Data Management System includes, but is not limited to any computing system implemented software systems, packages, programs, or applications, whether known at the time of filing or as developed thereafter. Examples of commercially available Computing System Implemented Data Management Systems include but are not limited to Quicken, QuickBooks, Microsoft Money, Microsoft Office Accounting, Peachtree Accounting, AccountXpress, Turbotax, TaxCut and TaxACT. However, one having ordinary skill in the art will appreciate that embodiments can be used in connection with virtually any type of software system, script, financial database, package, program or application involving the processing of information and/or the development of healthcare data.

The term "symbology" includes, but is not limited to, the use of symbols to graphically represent healthcare transactions.

The term "waypoint" includes, but is not limited to, a graphical representation of a healthcare transaction on a common thread, trail or map, usually in conjunction with other waypoints.

The term "lineage" includes, but is not limited to, one or more descendent healthcare transactions arranged in a visually navigable thread, trail or map from an initiating healthcare transaction.

Using one embodiment of a process and/or computing system for visualizing healthcare transactional relationships as disclosed herein, healthcare transactions are displayed in a graphical format which allows a user to visually track all the transactions associated with a particular healthcare insurance claim. From the graphically displayed healthcare transactional relationships, the user may identify how certain healthcare expenses were paid to one or more healthcare service providers, what payments were made on behalf of the patient by a healthcare insurance provider, and other related transactions or events so that the total cost, and the cost to the patient, for a particular healthcare insurance claim is determined and outputted to the user in a visually meaningful way.

Some exemplary embodiments are implemented in a computing system including a conventional computing system running a conventional operating system such as those distributed by Microsoft Corporation of Redmond Wash. (e.g., Windows XP); Apple Computer, Inc. of Cupertino Calif. (e.g., OS X); any Unix operating system and/or derivatives thereof (e.g., Linux, Solaris); the Palm OS series of operating systems; or any other operating system designed to generally manage operations on a computing system. Some embodiments may be implemented in a mobile computing system running mobile operating systems such as Symbian OS, Windows Mobile or CE, or any other operating system designed to generally manage operations on a mobile computing system.

Some exemplary embodiments may be included as add-on software for existing software programs, packages or applications, and embodiments may be a feature of an application that is bundled with a computing system or sold separately. Some embodiments may also be implemented as functionality embedded in hardware devices and systems.

Where appropriate, computer programs, applications, algorithms, routines and webpage scripts may be programmed in a high level language object oriented language, for example; Java, C, C++, C#, CORBA, Visual Basic, JavaScript, PERL and PHP or any other suitable programming language. Database components may utilize any commercially available database program, by way of example, and not limitation, ORACLE, Sequel Server, Sybase, MySQL, SQL, MS ACCESS, DB2, MS FOXBASE, DBASE, PostgreSQL, and RBASE or any other suitable database programming language.

Outputs generated by one or more embodiments may be displayed on a display screen, transmitted to a remote device, stored on any database, computer server or other storage mechanism, printed, or used in any other way. In some exemplary embodiments, the Computing System Implemented Data Management Systems described herein receive user inputs to the computing system implementing the process for visualizing healthcare transactional relationships, as discussed herein, via user interface devices such as a keyboard, mouse, touchpad, touch screen or any other device capable of providing user input to a computing system or for translating user actions into computing system operations.

The various exemplary embodiments disclosed herein may also be used to enhance the capabilities of existing data management software systems, packages, programs, or applications in a multitude of domains, including business data management systems and other insurance claim management contexts.

Figure 2:
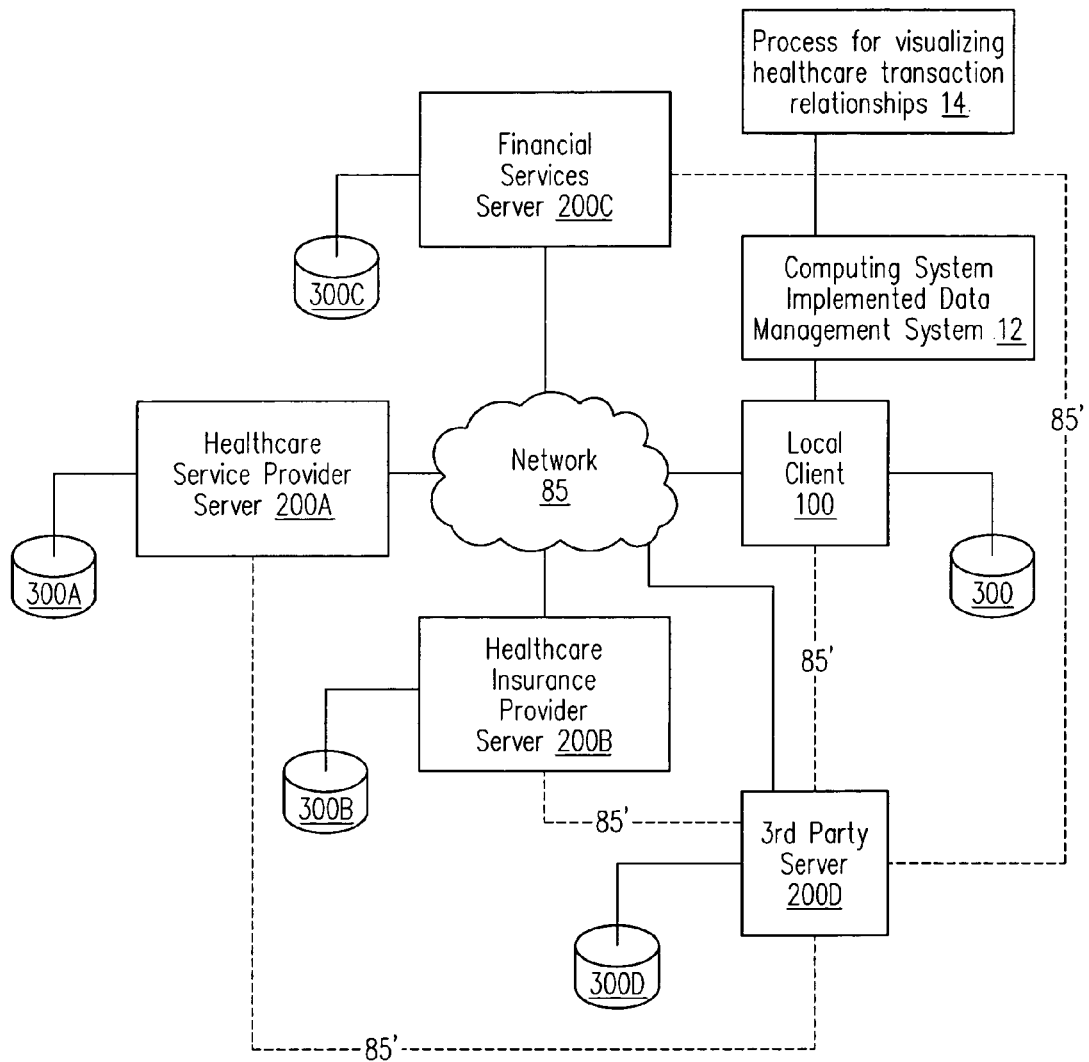
FIG. 2 depicts an exemplary network configuration in which one or more servers are in communication with a local client for implementing one or more of the inventive embodiments described herein.

FIG. 1 is a block diagram of an exemplary computing system. In one embodiment, the computing system is configured to implement an embodiment of a process for visualizing healthcare transactional relationships, such as the computer implemented process summarized in FIG. 6. In various exemplary embodiments, the computing system can be configured as a local client 100, as one or more networked servers 200A, 200B, 200C, 200D or as a combination of local client(s) 100 and networked servers 200A, 200B, 200C as are depicted in FIG. 2.

Returning to FIG. 1, in one embodiment, computing system 100 includes a console, or system unit, with one or more disk drives, a monitor, and a keyboard and operating system software or operating environment in the case of embedded devices. Computing system 100 includes a communications infrastructure 90 used to transfer data and memory addresses where data are to be found and to route control signals among the various components and subsystems associated with computing system 100.

One or more central processors 5, hereinafter referred to as a "processor", are provided to interpret and execute programmatic instructions, in one embodiment stored in Main memory 10. A high speed cache memory 2 may be included to allow more rapid transfer of programmatic instructions between Main memory 10 and registers associated with the processor 10. Main memory 10 is a general purpose storage area for the programmatic instructions and data to be processed by the processor 5. Main memory 10 may include volatile, non-volatile or a combination of volatile and non-volatile memory. In an exemplary embodiment, programmatic instructions for a Computing System Implemented Data Management System 12 and Process for visualizing healthcare transactional relationships 14 is operatively loaded therein.

Herein, the term "memory" is to be interpreted in its broadest sense and includes, but is not limited to, main memory 10, a secondary memory subsystem 30, and/or any other memory known at the time of filing or as developed thereafter. The terms "datastore" and/or "datasource" includes, but is not limited to, a "memory," and includes primary 10, secondary memory subsystem 30, and/or any other memory known at the time of filing or as developed thereafter. In one embodiment, memory 10 and/or memory 30 includes one or more Computing System Implemented Data Management Programs 12, stored, in whole, or in part, therein, that are used, as discussed below, with a process for visualizing healthcare transactional relationships, such as the process depicted in FIG. 6.

In one embodiment, a process for visualizing healthcare transactional relationships 14 is integrated with, coupled to, or otherwise gathers healthcare information with Computing System Implemented Data Management System 12 for outputting of the visualized healthcare transactional relationships to a display 25.

In one embodiment, a timing circuit 15 is provided to coordinate programmatic activities with the various components within and coupled to computing system 100 in near real time. Timing circuit 15 may be used as a watchdog timer, clock or an event counter arrangement and may be programmable.

Processor 5, main memory 10 and timing circuit 15 are directly coupled to a communications infrastructure 90. A display interface 20 is provided to drive a display 25 associated with computing system 100. Display interface 20 is electrically coupled to communications infrastructure 90 and provides video signals to display 25 for visually outputting both graphical displays and alphanumeric characters.

Display interface 20 may include a dedicated graphics processor and memory (not shown) to support the displaying of graphics intensive information. Display 25 may be of any type (e.g., cathode ray tube, gas plasma, liquid crystal display (LCD)). Secondary memory subsystem 30 is provided which houses computer readable storage media units such as a hard disk drive 35, a removable storage drive 40, an optional logical media storage drive 45 and optional removal storage media 50.

One having ordinary skill in the art will appreciate that hard drive 35 may be replaced with flash RAM or other storage media. Removable storage drive 40 may be a replaceable/removable hard drive, optical media storage drive or a solid state flash RAM device. Logical media storage drive 45 may include a flash RAM device, an EEPROM encoded with playable media, or optical storage media (CD, DVD).

Removable computer readable storage media 50 may be logical, optical or of an electromechanical (hard disk) design. An optional auxiliary interface 55 may be provided to allow additional devices to be coupled to communications infrastructure 90. For example, a global positioning system (GPS) receiver, an audio processing subsystem, an analog or digital modem, an infrared transceiver, an RFID scanner, or another peripheral device which could be connected to auxiliary interface 55.

A communications interface 60 is provided which allows for standardized electrical connection of peripheral devices to the communications infrastructure 90 including, serial, parallel, USB, PS2, PCMCIA and Firewire connectivity. One example of a peripheral device is a printer 95 for outputting text or computer-generated images onto paper or onto another physical medium, such as a transparency film.

In another example, a user interface 70 and a transceiver 65 are electrically coupled to the communications infrastructure 90 via the communications interface 60. The transceiver 65 facilitates the remote exchange of data and synchronizing signals between computing system 100 and other devices in network communications 85 with computing system 100. By way of example, devices that may be in communication with computing system 100 include, but are not limited to one or more of remote servers 200A, 200B, 200C, 200D (FIG. 2) from which healthcare, financial and insurance data may be gathered by computing system 100.

The transceiver 65 is envisioned to be of a type normally associated with computer networks for example, wired and wireless computer networks 85 based on the various IEEE standards 802.11x, where x denotes the various present networking communications standards (e.g., 802.11a, 802.11b, 802.11g, 802.11n,) and evolving networking communications standards, example WiMax 802.16, WRANG 802.22 and BlueTooth 802.15.3a.

Alternately, digital cellular communications formats compatible with for example GSM, 3G, CDMA, TDMA and evolving cellular communications standards. Both peer-to-peer (PPP) and client-server models are envisioned for implementation. In another embodiment, the transceiver 65 may include hybrids of various computer communications standards, cellular telephone standards and evolving satellite radio standards.

The user interface 70 employed on computing system 100 may include a keyboard 75, a pointing device 80 such as a mouse, thumbwheel, track ball, or touchpad, voice recognition software and/or hardware. In addition, user interface 70 may include the display interface 20 and the operatively coupled display 25 (e.g., touch screen user interface.) For purposes of this specification, the term user interface 70 includes the hardware, firmware and/or software by which a user interacts with computing system 100 and the means by which computing system 100 conveys information to the user, and/or any other device and/or mechanism capable of coverting user actions into computing system executable instructions and/or actions. In one embodiment, user interface 70 provides interrupt signals to processor 5 via communications infrastructure 90 that may be used to recognize and interpret user interactions with computing system 100. One having ordinary skill in the art will appreciate that the user interface devices that are not shown are well known and understood in the relevant art.

Although a process for visualizing healthcare transactional relationships and/or a Computing System Implemented Data Management System, is sometimes referred to herein, alternatively, as a process, an application, a module, applet, a program, routine, a component of a software system, a component of a software package, a component of a parent system, a plug-in, or a feature of a parent system, this terminology is illustrative only.

In some embodiments, a process for visualizing healthcare transactional relationships and/or a Computing System Implemented Data Management System is capable of being called from an application or by the operating system. In one embodiment, an application, process, or program is generally defined to be any executable code. Moreover, those persons having ordinary skill in the art will appreciate that when it is said that an application, process, or an operation takes some action, the action is often the result of executing one or more programmatic instructions by a processor such as processor 5.

In one embodiment, execution of a process for visualizing healthcare transactional relationships and a Computing System Implemented Data Management System by a processor 5, or a server system 200A, 200B, 200C, 200D, (FIG. 2) results in the operations of an agent computer process (not shown) and/or a rules-based computer process (not shown).

FIG. 2 depicts an exemplary network configuration in which one or more servers 200A, 200B, 200C, 200D are in networked communications with a local client 100. The network 85 can be any network or network system that is of interest to a user such as a Local Area Network (LAN), a Wide Area Network (WAN), a public network, such as the Internet, a private network 85' for example, a publicly switched telephone network (PSTN) or other network capable of allowing communication between two or more computing systems.

In one embodiment, one or more servers such as server 200A may be associated with a healthcare service provider. In one embodiment, a healthcare service provider maintains a plurality of healthcare transaction records in a datastore 300A operatively coupled to the healthcare server 200A.

In one embodiment, a second server 200B may be associated with a healthcare insurance provider. In one embodiment, the healthcare insurance provider maintains a plurality of healthcare insurance transaction records in a datastore 300B operatively coupled to the healthcare insurance provider's server 200B.

In one embodiment, a third server 200C may be associated with a financial services company such as a bank, savings and loan, credit union, brokerage or credit card company. In one embodiment, the financial services company maintains a plurality of financial transaction records in a datastore 300C operatively coupled to the financial server 200C.

In one embodiment, a third party provider 200D is used to consolidate information in a separate datastore 300D from one or more of the healthcare service provider, healthcare insurance provider and financial servers 200A, 200B, 200C, 200D which allows the local client 100 to gather the information in a format expected by Computing System Implemented Data Management System 12 and/or process for visualizing healthcare transactional relationships 14.

In one embodiment, a local client 100 associated with a patient is configured as a Computing System Implemented Data Management System 12 which includes a process for visualizing healthcare transactional relationships 14 for outputting graphically visualized healthcare transactional relationships to a display 25 of the local client 100. In one embodiment, the local client 100 includes a local datastore 300 in which information gathered from one or more of the networked servers 200A, 200B, 200C, 200D is stored and accumulated for processing by Computing System Implemented Data Management System 12. In one embodiment, the healthcare, financial and healthcare insurance provider transactions records are maintained locally in the datastore 300 coupled to the local client 100 and periodically updated by the user.

In one embodiment, the third party server 200D is connected to one or more of the other networked servers 200A, 200B, 200C and the local client 100 by leased lines or a separate private network 85'.

In one embodiment, the healthcare, financial and insurance transaction records may be periodically "pushed" to the local client 100 as part of a subscription service. In another embodiment, the healthcare, financial and insurance transaction records may be "pulled" from one or more of the networked servers 200A, 200B, 200C, 200D upon request by the local client 100. In one embodiment, requests for obtaining the healthcare service provider, healthcare insurance provider and/or financial transaction records from one or more of the networked servers 200A, 200B, 200C, 200D requires proper authentication of the user requesting the records from the local client 100.

In addition, in one embodiment, transfers of information between or among one or more of networked servers 200A, 200B, 200C, 200D and local client 100 is accomplished using a secure communications protocol for example SSL, or the file transfer equivalent HTTPS. In one embodiment, other security arrangements known in the relevant art may be implemented as well.

One having ordinary skill in the art will appreciate that one or more of computing systems 100, 200A, 200B, 200C, 200D are embodied as a portable computer (e.g., laptop,) a workstation, a two-way pager, a cellular telephone, a smart phone, a digital wireless telephone, a personal digital assistant (PDA), a portable media player, a server, a network appliance, or any other device that includes components that can execute all, or part, of a process for visualizing healthcare transactional relationships.

Figure 3:
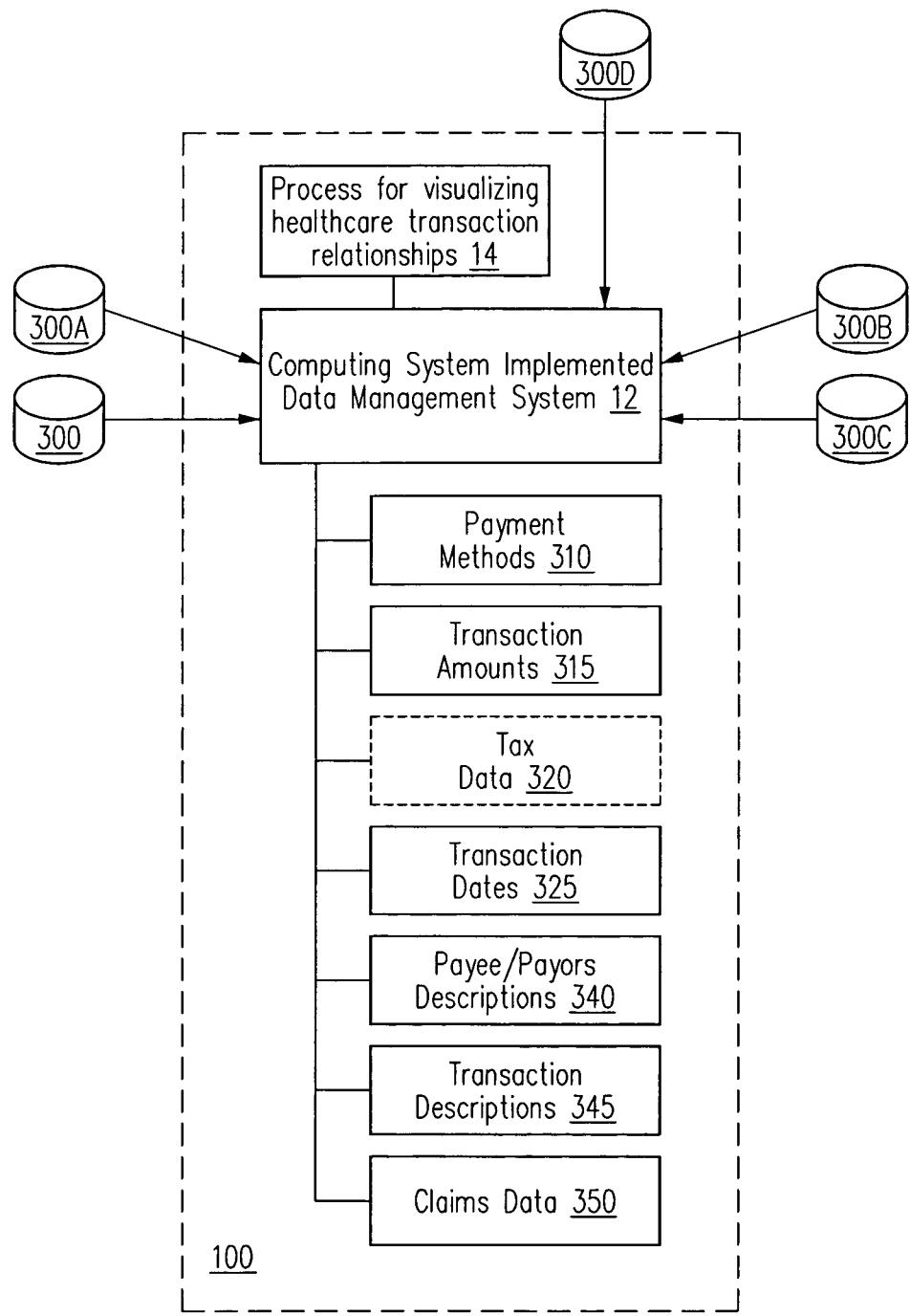
FIG. 3 depicts an exemplary data gathering arrangement in which one or more of healthcare, insurance and financial transaction records are gathered from one or more data sources for processing by a Computing System Implemented Data Management System operative on a local client.

FIG. 3 depicts an exemplary data gathering arrangement in which healthcare, insurance and financial transaction records are gathered from one or more of the data sources 300, 300A, 300B, 300C, 300D for processing by Computing System Implemented Data Management System 12. In one embodiment, Computing System Implemented Data Management System 12 of the local client 100 gathers payment methods 310, transaction amounts 315, optional tax data 320, transaction dates 325, entity descriptions 340, transaction descriptions 345 and insurance claims data 350.

In one embodiment, Computing System Implemented Data Management System 12 uses heuristic intelligence, data mining and/or matching algorithms to associate the gathered healthcare, financial and healthcare insurance provider records with a particular insurance claim based on points of commonality within the gathered records. A non-exclusive summary of the information gathered from the various transaction records is provided below in Table 1.

TABLE 1

Summary of Transaction Records

Healthcare Service Provider Records—Patient Name, Date of Service, Patient Payment Amount, Date of Patient Payment, Insurance Invoice Amount, Date of Insurance Invoice, Treatment Code, Provider Name, Insurance Payment Received, Date Insurance Payment was Received, Exception Codes.
Financial Transaction Records—Actual Transaction Date, Processing Date, Transaction Amount, Payee Name, Financial Institution Name, Account Number.
Healthcare Insurance Provider Records—Claim Number, Patient Name, Date of Service, Claim Amount Paid, Date Claim was Paid, Exception Code(s), Provider Name, Healthcare Insurance Provider Name.

In one embodiment, Computing System Implemented Data Management System 12 gathers and organizes the various transaction action records by way of a unique insurance claim number.

However, in some cases, an insurance claim number may not yet have been assigned or otherwise associated with a particular transaction. In this situation, in one embodiment, Computing System Implemented Data Management System 12 uses heuristic intelligence, data mining, web crawling, and/or matching algorithms to associate the gathered healthcare, financial and healthcare insurance provider records with a particular insurance claim based on points of commonality within the gathered records.

In one embodiment, Computing System Implemented Data Management System 12 attempts to match transaction dates between the healthcare service provider and the Healthcare insurance provider in order to generate one or more composite records for outputting to display 25 by Process for visualizing healthcare transactional relationships 14. In certain instances, the Healthcare service provider names and transaction dates may differ among the various gathered records.

For example, a patient visits a physician for an ailment and is provided a prescription for a medication by the treating physician on Day 1 (i.e., Initiating Transaction.) The patient then has the prescription filled by a pharmacy on Day 2. In this instance, both the provider name and date will differ from those of associated with the initiating transaction on Day 1. In one embodiment, Computing System Implemented Data Management System 12 may then associate all transactions related to the pharmacy to the initiating transaction based on proximity of the Day 1 and Day 2 transaction dates.

In one embodiment, the names of the treating physician and/or pharmacy are processed by Computing System Implemented Data Management System 12 for a frequency of occurrence. In one embodiment, if either or both provider names (treating physician and pharmacy) are already known to computing system 100, the computing system may automatically associate proximate healthcare transactions with one another.

In one embodiment, the matching algorithms may attempt to match related transactions based on transaction dates, financial institution names, provider names and/or using account numbers. For example, a particular financial institution name or account number may be indicative of a healthcare transaction, if associated with a flexible spending account (FSA) number or the name of the plan administrator associated with FSA.

In one embodiment, the user may be afforded the option of aggregating different claim numbers and the associated provider, financial and healthcare insurance provider records under a common claim number.

In one embodiment, Computing System Implemented Data Management System 12 includes a lookup table or equivalent mechanism to convert standardized treatment codes and/or healthcare insurance provider exception codes into a comprehensible textual explanation. The textual explanation provides a reason for visiting a healthcare service provider based on, for example, International Classification of Diseases (ICD), Healthcare Common Procedure Coding System (HCPCS), Current Procedural Terminology (CPT) or any other standardized healthcare coding system. Likewise, healthcare insurance provider exception codes may be automatically translated by the computing system from obscure numerical or alphanumerical designations into comprehensible textual explanations.

In one embodiment, the gathered transaction record(s) may be stored separately as one or more composite records in the datastore 300 associated with the local client 100 or dynamically mapped to record source(s) 300, 300A, 300B, 300C, 300D using, for example, Open Database Connectivity (ODBC) functions.

In one embodiment, the gathered tax data 320 may be used for determining whether a patient has exceeded the current deductibility requirements for inclusion of healthcare expenses in state and/or federal income tax filings.

Figure 4:
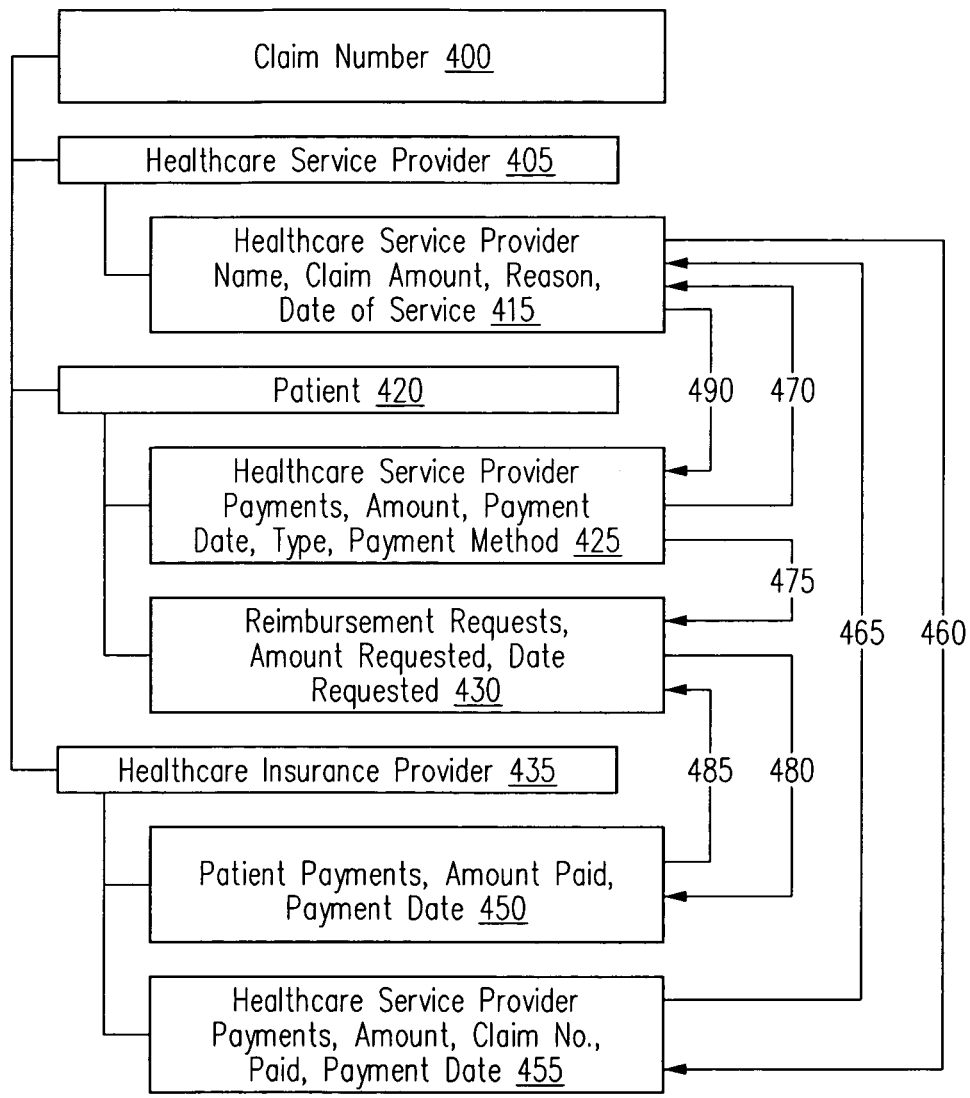
FIG. 4 depicts exemplary data relationships for the data gathered and organized from the one or more data sources.

In one embodiment, the gathered financial, insurance and provider records data are processed by Computing System Implemented Data Management System 12 and where necessary, reorganized such that the gathered data is indexed by at least the insurance claim numbers which is included in the claims data as is depicted in FIG. 4. In one embodiment, the gathered data may also be indexed chronologically by transaction dates, by healthcare service provider name and/or other points of commonality as described above.

FIG. 4 depicts exemplary data relationships for the data gathered from the one or more of data sources 300, 300A, 300B, 300C, 300D by Computing System Implemented Data Management System 12. In one embodiment, each identified claim number 400 is associated with one or more provider records 405, a patient record 420 and one or more healthcare insurance provider records 435. In one embodiment, each provider record(s) 405 includes the providers' name(s), the claim amount(s), the reason(s) for the healthcare visit(s,) and the date(s) of service 415. In one embodiment, each patient record 420 includes payments made to the provider(s), the amount(s) paid, the date(s) of payment, the type(s) of payment (e.g., copayment, deductible, out-of-pocket) and the method of payment 425 (credit card, check, debit card, flexible spending account (FSA) card, electronic funds transfer, etc.), and reimbursement request(s) made by the patient. In one embodiment, the healthcare insurance provider record(s) 435 includes a claim number, payment(s) made to the provider(s), amount(s) paid, date(s) of payment, payment(s) made to the patient, and date(s) of payment.

By way of example, after visiting a healthcare service provider 405, a patient 420 typically pays 470 the provider 405 a copayment and may seek reimbursement from a healthcare insurance provider or other third party 475, 480 such as a flexible spending account (FSA) plan administrator. The provider 405 may receive payments 465 from a healthcare insurance provider and/or a patient 470. Overpayments paid to the provider 405 may be repaid to the patient 490 and/or healthcare insurance provider 460.

Likewise, in one embodiment, copayment reimbursements may be paid to the patient 420 by the healthcare insurance provider 485. In one embodiment, each of these transactions is accounted for by Computing System Implemented Data Management System 12 and outputted by Process for visualizing healthcare transactional relationships 14 as the visualized healthcare transactional relationships on display 25 of local client 100 as a lineage of individually selectable waypoints.

Figure 5A:
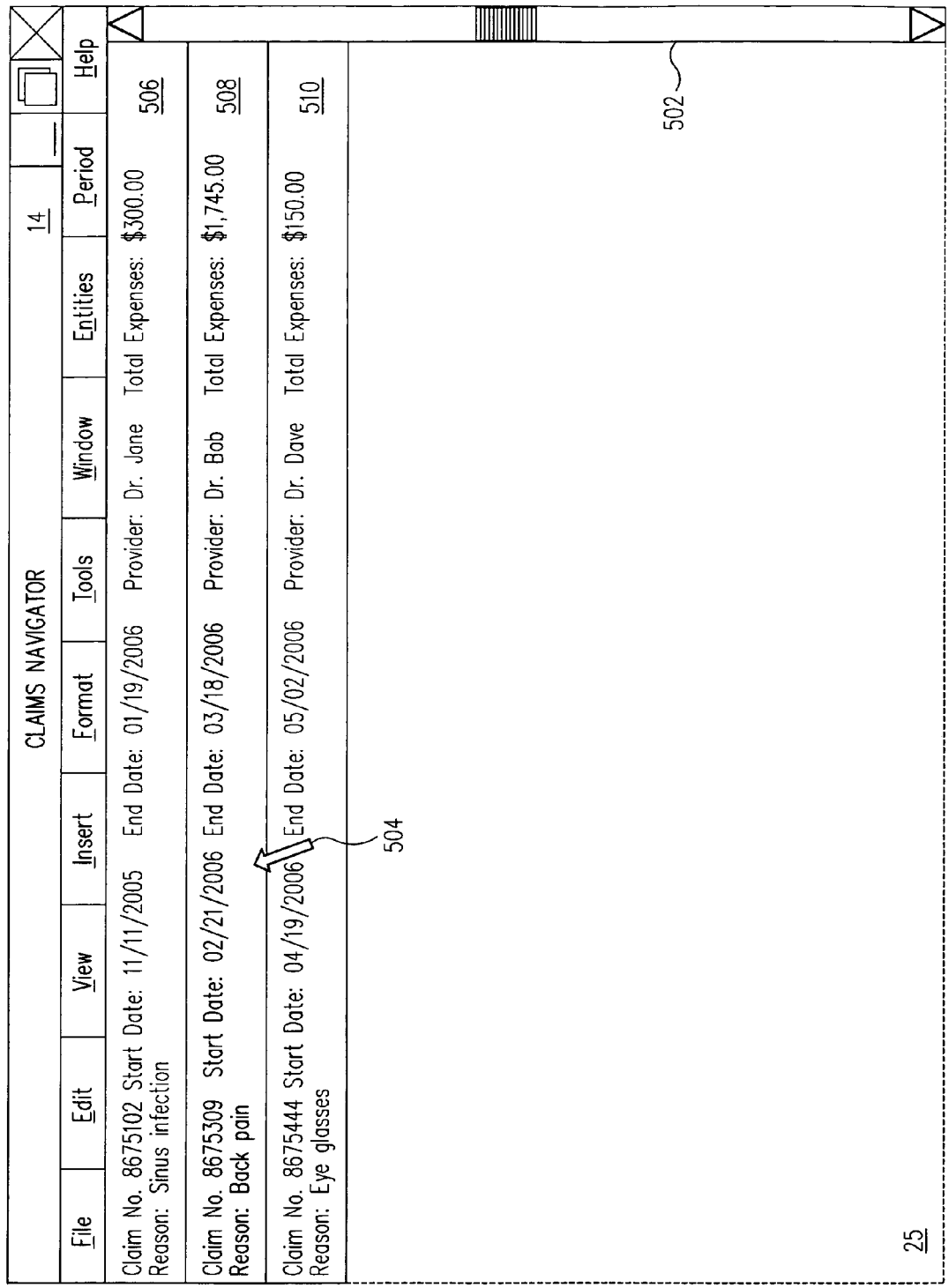
FIG. 5A provides an exemplary graphical user interface (GUI) display for visualizing healthcare transactional relationships in a list format.

FIG. 5A provides an exemplary graphical user interface (GUI) display for visualizing healthcare transactional relationships by Process for visualizing healthcare transactional relationships 14. In one embodiment, after Computing System Implemented Data Management System 12 has gathered, processed and organized the healthcare, financial and healthcare insurance provider data as previously described, Process for visualizing healthcare transactional relationships 14 graphically outputs to display 25 of local client 100, listings of the insurance claims 506, 508, 510 available for selection and review by a user. In one embodiment, the GUI of Process for visualizing healthcare transactional relationships 14 allows the user to scroll 502 through the list displayed claims to locate a particular claim of interest.

In one embodiment, the listings of displayed claims 506, 508, 510 may be limited to a particular period of time and/or by selected healthcare service providers. To assist the user in identifying the particular claim of interest, summary information associated with each listed claim is provided. For example, the claim number, start and end dates of the transaction lineage, initial healthcare service provider for which the claim number was generated and optionally the total expenses incurred for the transaction family.

In one embodiment, in order to view the transaction history of a particular claim, the user selects 504 one of the claims 508 using a cursor 504 driven by the pointing device 80. Process for visualizing healthcare transactional relationships 14 outputs to display 25 of local client 100, a graphical representation of the lineage of transactions for the selected claim 508. An exemplary output display is depicted in FIG. 5B.

Figure 5B:
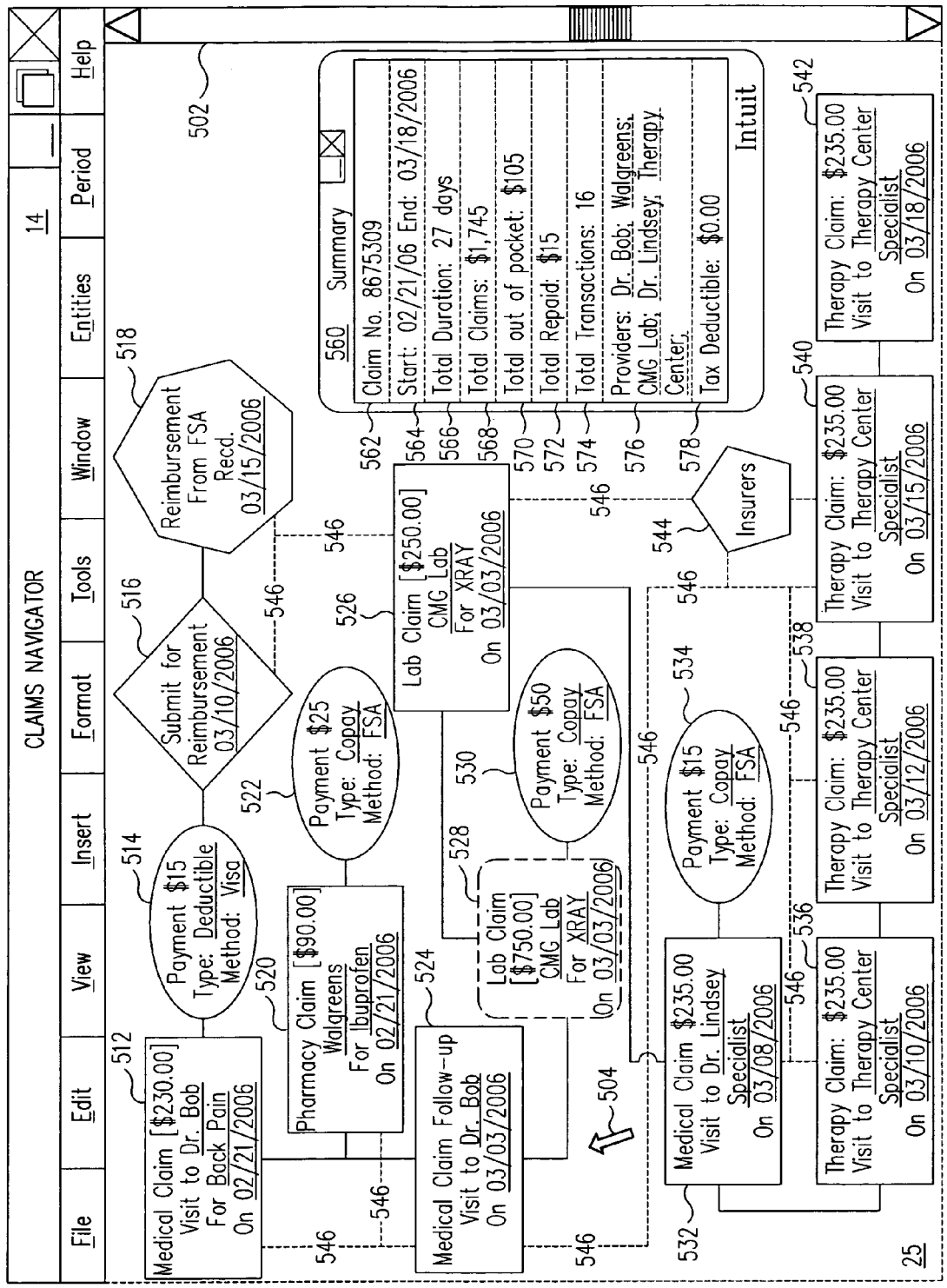
FIG. 5B provides an exemplary graphical user interface depiction of chronologically arranged waypoints associated with a selected claim.

FIG. 5B provides an exemplary depiction of chronologically arranged lineage of transactions associated with the selected claim 508 of FIG. 5A. The operation of Process for visualizing healthcare transactional relationships 14 is discussed by way of the following specific example. Patient (John) has back problems. Patient (John) calls his primary healthcare service provider Dr. Bob and makes an appointment to discuss his back pain. During the visit, John discusses his back problem with Dr. Bob 512. Dr. Bob prescribes a two week medication of prescription strength Ibuprofen.

John pays Dr. Bob $15 using his personal credit card 514. Since John has not met his required annual deductible, the $15 dollar payment is submitted for reimbursement 516 from a flexible spending account (FSA) on Mar. 10, 2006. A reimbursement check is sent by the administrator of the FSA on Mar. 15, 2006 for $15 518.

John proceeds to a pharmacy to fill his prescription for Ibuprofen. The prescription costs a total of $90 of which John's healthcare insurance provider 544 is direct billed 546 $65. John pays the remaining balance of $25 with his FSA card 522.

During the course of his medication therapy, John's pain seems to be reduced. However, when he completes the medication, his back pain returns. John arranges for a follow-up visit with Dr. Bob 524. Dr. Bob sends John to an imaging laboratory for X-Rays 526. John again makes a co-payment of $50 using his FSA card for the X-Rays 530. However, unbeknownst to John, the imaging lab makes a billing error of $750 528 which is direct billed 546 to the healthcare insurance provider 544. The healthcare insurance provider 544 rejects the bill, requiring the imaging lab to correct the error. The imaging lab again direct bills 546 the healthcare insurance provider 544 for the correct amount of $200. The claim is then reprocessed by the healthcare insurance provider 544 who then pays 546 the corrected claim amount of $200 to the imaging lab 528. This entire reprocessing transaction occurs without John's knowledge or interaction.

Dr. Bob checks the X-Rays and suggests that John visit a specialist, Dr. Lindsey. John visits Dr. Lindsey on Mar. 8, 2006 and receives an order for physical therapy 532. John pays Dr. Lindsey $15 for a copayment again using his FSA card 534. Dr. Lindsey direct bills 546 John's healthcare insurance provider for the remaining $220. John visits the physical therapy center on four separate occasions 536, 538, 540, 542 and incurs treatment expenses of $235 per session. Each of the physical therapy treatments are fully covered under his medical insurance plan and are direct billed 546 to his healthcare insurance provider 544 for payment.

In one embodiment, John's entire transaction history associated with his back pain is displayed 25 as a series of individually selectable waypoints 512, 514, 516, 518, 520, 522, 524, 526, 528, 530, 532, 534, 536, 538, 540, 542, 544 which are visually differentiated by an initiating entity such as the patient (John) 514, 516, 522, 530, 534, the providers (Dr. Bob, Dr. Lindsey, Walgreens Pharmacy, CMG Laboratories, Therapy Center) 512, 520, 524, 526, 532, 536, 538, 540, 542, or the healthcare insurance providers 544. Each waypoint is displayed as a lineage depending from the initial transaction in which John first visited Dr. Bob 512.

In one embodiment, the visual differentiation may be accomplished using symbology, color-coding, grayscale shading, inverse video and any combination thereof. Each waypoint displays a summary of the transaction it represents, for example, medical claims, payments, reimbursement submittals, reimbursements, provider names, payment types, and reasons for visiting the healthcare service providers.

In one embodiment, a floating window 560 is provided which displays a summary of the entire transaction lineage. For example, the claim number 562, the duration of the claim 566, cumulative cost of the claim 568, cumulative out-of-pocket expenses 570, the cumulative amount reimbursed 572, the total number of transactions associated with the claim 574, the providers used to healthcare services 576, and optionally amount(s) which may be tax deductible 578.

In one embodiment, the provider(s) 572 displayed in the floating window 560 may be individually selected to locate other claims for which healthcare services have been rendered to the patient by the selected provider. The cursor 504 may also be used to individually select a waypoint 512, 514, 516, 518, 520, 522, 524, 526, 528, 530, 532, 534, 536, 538, 540, 542, 544 to view specific transaction details associated with the selected waypoint as is discussed below.

Figure 5C:
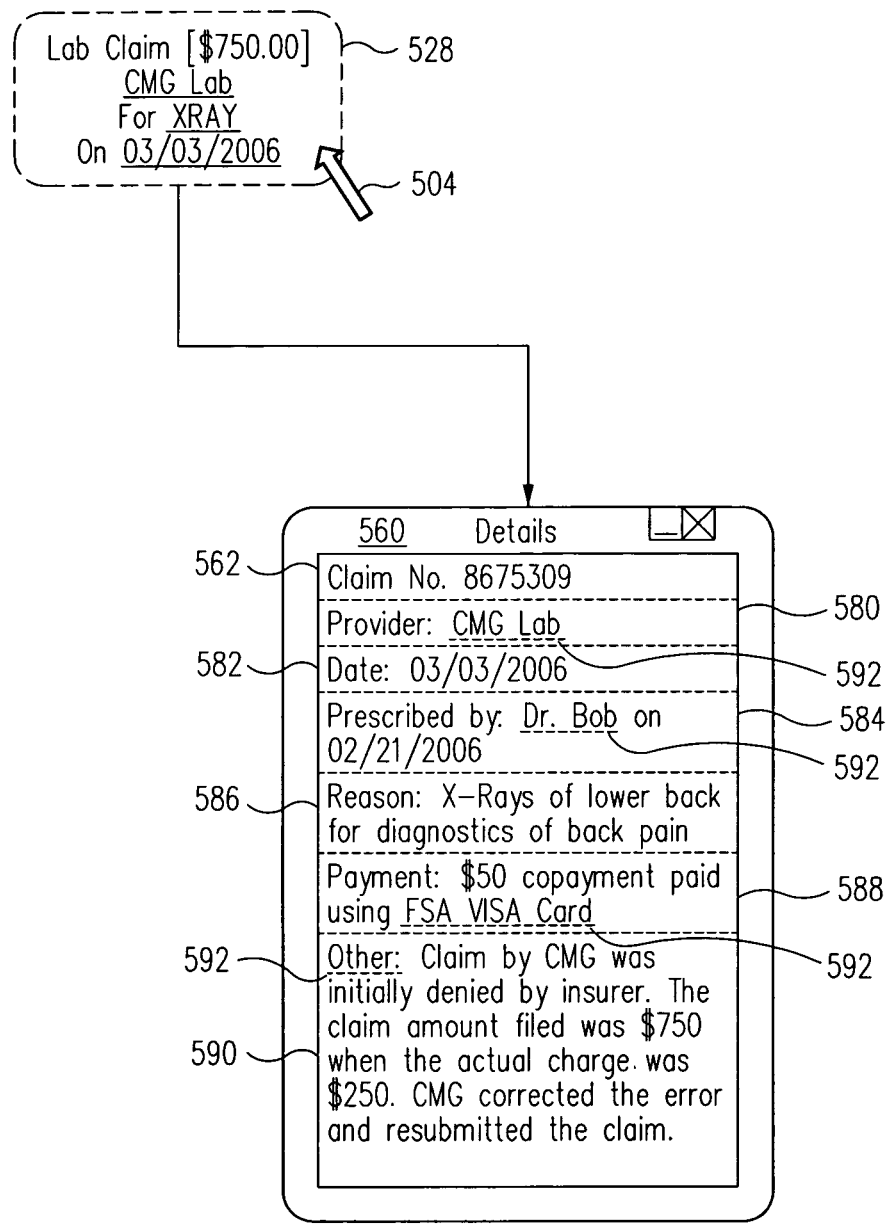
FIG. 5C provides an exemplary user selection of a specific waypoint for displaying details associated with the particular waypoint.

Referring to FIG. 5C, in one embodiment, using cursor 504, a user selects the highlighted and visually differentiated lab claim transaction 528 of FIG. 5B to determine what anomaly occurred with this transaction. The floating window 560 displays a detail listing of the transaction 528 including the claim number 562, the provider name 580, date of the transaction 582, a referral name if applicable 584, the reason for visiting the healthcare service provider 586, type and amount of payments made to the provider 588, and an explanation field 590 for capturing information useful for reviewing the specific transaction.

In one embodiment, selection of one or more of the fields 592 allows for downloading of any corresponding documentation, or alternately may be used to access other records pertaining to the selected item. In one example, selecting "CMG Lab," "Dr. Bob," or "FSA VISA Card" 592 provides a listing of all records related to the selection. In another example, selecting the "Other" field retrieves the documentation associated with the insurance company's initial claim denial and the resubmitted claim by CMG Laboratories.

Figure 6:
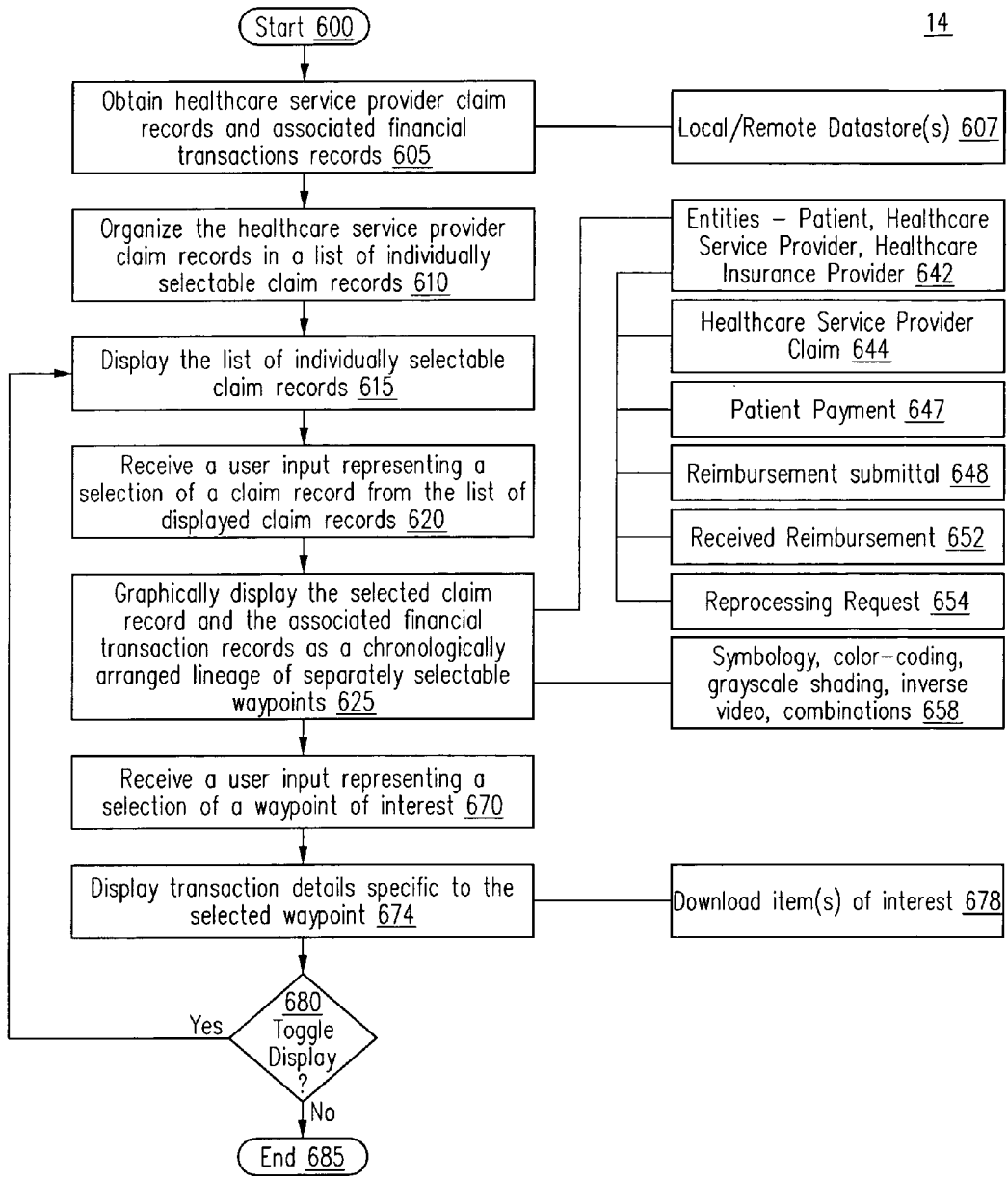
FIG. 6 provides an exemplary computing system implemented process for visualizing healthcare transactional relationships.

FIG. 6 provides an exemplary process for visualizing healthcare transactional relationships 14, such as process for visualizing healthcare transactional relationships 14 of FIG. 1. Returning to FIG. 6, in one embodiment, process for visualizing healthcare transactional relationships 14 is initiated at start operation 600 by a user selecting an option available from a Computing System Implemented Data Management System 12. Computing System Implemented Data Management System 12 gathers healthcare claim records and associated financial records from one or more sources 605. The one or more sources may include both local and remote data sources 607 as is discussed with respect to FIGS. 2 and 3.

In one embodiment, a computing system, such as Computing system 100 of FIG. 1, thereafter organizes the gathered records such that healthcare and financial records are associated with their respective insurance claim records 610 (FIG. 6). The claim records are then output by a process for visualizing healthcare transactional relationships 14 to a display 25 as a listing of individually selectable claim records 615.

Upon receipt of a user selection of a displayed claim record 620, process for visualizing healthcare transactional relationships 14 graphically displays the selected claim record and the associated financial transaction records as a chronologically arranged lineage of separately selectable waypoints 625. In one embodiment, if the user desires, he or she may select a waypoint of interest 670 to display financial transaction details specific to the selected waypoint 674.

In one embodiment, each graphically displayed waypoint may be visually differentiated according to an initiating entity such as the patient, provider, or healthcare insurance provider 642 and/or according to the type of transaction which is associated with the transaction. For example, a provider claim 644, patient payment 647, reimbursement submittal 648, received reimbursement 652 or a claim reprocessing request 654. In one embodiment, the visual differentiation may employ symbology, color-coding, grayscale shading, inverse video, and/or various combinations thereof 658.

In one embodiment, the user may select an item of interest from the selected waypoint for downloading from a remote datastore 678. For example, a missing insurance claim or EOB.

In one embodiment, the user may toggle 680 the display between a graphics display mode (FIG. 5B) and a list display mode (FIG. 5A). Once the user has completed usage of computing system, processing ends 685.

The various inventive embodiments have been described in particular detail with respect to specific possible embodiments. Those persons having ordinary skill in the art will appreciate that the various inventive embodiments may be practiced in other embodiments. For instance, those persons having ordinary skill in the art will readily appreciate that the order of operations or processing sequences discussed above was presented for illustrative purposes only and that other orders of operations, sequence and combination of operations, are possible. Consequently, the order of operations or processing sequences discussed above does not limit the inventive scope as Claimed.

In addition, the nomenclature used for components, capitalization of component designations and terms, the attributes, data structures, or any other programming or structural aspect is not significant, mandatory, or limiting, and the mechanisms that implement the inventive embodiments or features may have various different names, formats, and/or protocols. Further, the system and/or functionality of the various inventive embodiments may be implemented by various combinations of software and hardware, as described herein, or entirely in hardware elements.

Also, particular divisions of functionality between the various components described herein are merely exemplary, and not mandatory or significant. Consequently, functions performed by a single component may, in some embodiments, be performed by multiple components, and functions performed by multiple components may, in some embodiments, be performed by a single component.

Some portions of the above description present the various inventive embodiments in terms of algorithms and symbolic representations of operations, or algorithm-like representations, of operations on information/data. These algorithmic and/or algorithm-like descriptions and representations are the means used by those persons having ordinary skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise herein, as would be apparent from the above discussion, it is appreciated that throughout the above description, discussions utilizing terms such as "gathering", "establishing", "defining", "requesting", "analyzing", "providing", "obtaining", "accessing", "selecting", "listing", "determining", "storing", "organizing", etc., refer to common actions and processes of a computing system or similar electronic device that manipulates and operates on data represented as physical (electronic) quantities within the computing system memories, registers, caches or other information storage, transmission or display devices.

Certain aspects of the inventive embodiments include process steps or operations and instructions described herein in an algorithmic and/or algorithmic-like form. It should be noted that the process steps and/or operations and instructions of the various inventive embodiments may be performed in software, firmware, and/or hardware, and when embodied in software, may be downloaded to reside on and be operated from different platforms used by real time network operating systems.

The various inventive embodiments also relate to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those persons having ordinary skill in the art will readily appreciate that the algorithms and operations presented herein are not inherently related to any particular computing system, computer architecture, computer or industry standard, or any other specific apparatus. Various general purpose computing systems may also be used with programs in accordance with the teaching herein, or it may prove more convenient/efficient to construct more specialized apparatuses to perform the required operations described herein.

The required structure for a variety of these systems will be apparent to those persons having ordinary skill in the art, along with equivalent variations. In addition, the various inventive embodiments are not described with reference to any particular programming language and it is appreciated that a variety of programming languages may be used to implement the teachings of the various inventive embodiments as described herein, and any references to a specific language or languages are provided for illustrative purposes only and for enablement of the contemplated best mode of the various inventive embodiments at the time of filing.

The various exemplary embodiments described herein are well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the specification of the various inventive embodiments is intended to be illustrative, but not limiting, of the inventive scope, which is set forth in the Claims below.

In addition, the operations shown in the figures are shown in an exemplary order for ease of description and understanding. However, those persons having ordinary skill in the art will readily appreciate that numerous different orders of operation could be employed. Consequently, the order of operations shown in the figures is illustrative only and does not limit the inventive scope as Claimed below.

In addition, the operations shown in the figures are identified using a particular nomenclature for ease of description and understanding, but other nomenclature is often used in the art to identify equivalent operations.

Therefore, numerous variations, whether explicitly provided for by the specification or implied by the specification or not, may be implemented by one having ordinary skill in the art in view of this specification.

What is claimed:

1. A system for visualizing healthcare transactional relationships comprising:
   a processor; and
   a memory coupled to the processor having instructions stored therein which when executed by the processor, perform a process for visualizing healthcare transactional relationships, the process for visualizing healthcare transactional relationships comprising:
   obtaining healthcare claim information through a network from two or more different data sources remote from the process for visualizing healthcare transactional relationships the types of data sources being a bank and at least one selected from a healthcare provider and a health insurance provider, the obtained healthcare claim information collectively comprising financial transactions, and healthcare and insurance related claim information;
   analyzing the obtained healthcare claim information using heuristic techniques and matching algorithms to associate the obtained financial, healthcare, and insurance related claim information with particular insurance claims based on points of commonality within the obtained information comprising transaction dates, financial institution names, provider names and account numbers;
   organizing the analyzed healthcare claim information as a listing of individually selectable claim records;
   displaying the listing of individually selectable claim records;
   receiving a user input representing a selection of a claim record from the listing of displayed individually selectable claim records; and,
   graphically displaying the selected claim record and financial transaction records associated with the selected claim record as a chronologically arranged lineage of selectable waypoints presented as one of a graphically navigable trail, thread or map, each waypoint being associated with a claim transaction type, each waypoint associated with a given transaction type being visually differentiated in the graphical display according to the transaction type associated with each waypoint, the process configured to graphically display transaction types including at least provider claims, patient payments, reimbursement submittals, received reimbursements and claim reprocessing requests.

2. The system according to claim 1 wherein the process is configured to display waypoints having individual initiating entities selected from a patient, a financial institution, a healthcare service provider, and a healthcare insurance provider.

3. The system according to claim 1 wherein the graphically displaying of selectable waypoints comprises using one of symbology, color-coding, grayscale shading, inverse video and any combination thereof.

4. The system according to claim 1 wherein each of the displayed waypoints includes a unique transaction summary.

5. The system according to claim 1 wherein user selection of a displayed waypoint provides additional transaction details specific to the selected waypoint.

6. The system according to claim 1 wherein the lineage is displayed as a visually navigable thread among associated waypoints.

7. The system according to claim 3 wherein a waypoint is visually differentiated from other displayed waypoints when a discrepancy exists between selectable waypoints.

8. The system according to claim 1 wherein at least a portion of the additional transaction details are downloadable from a remote data source.

9. A computer program product embodied in a non-transitory form on a computer readable storage medium, the computer program product comprising instructions which when executed by a processor, causes the processor to perform a process comprising:

obtaining healthcare claim information through a network from two or more different data sources remote from the process for visualizing healthcare transactional relationships the types of data sources being a bank and at least one selected from a healthcare provider and a health insurance provider, the obtained healthcare claim information collectively comprising financial transactions, and healthcare and insurance related claim information;

analyzing the obtained healthcare claim information using heuristic techniques and matching algorithms to associate the obtained financial, healthcare, and insurance related claim information with particular insurance claims based on points of commonality within the obtained information comprising transaction dates, financial institution names, provider names and account numbers;

organizing the analyzed healthcare claim information as a listing of individually selectable claim records;

displaying the listing of individually selectable claim records;

receiving a user input representing a selection of a claim record from the listing of displayed individually selectable claim records; and, graphically displaying the selected claim record and financial transaction records associated with the selected claim record as a chronologically arranged lineage of selectable waypoints presented as one of a graphically navigable trail, thread or map, each waypoint being associated with a claim transaction type, each waypoint associated with a given transaction type being visually differentiated in the graphical display according to the transaction type associated with each waypoint, the process configured to graphically display transaction types including at least provider claims, patient payments, reimbursement submittals, received reimbursements and claim reprocessing requests.

10. The non-transitory computer program product according to claim 9 wherein each waypoint is associated with an initiating entity comprising one of a patient, a healthcare service provider and a healthcare insurance provider.

11. The non-transitory computer program product according to claim 9 wherein user selection of a displayed waypoint provides additional transaction details specific to the selected waypoint.

12. The non-transitory computer program product according to claim 9 wherein at least a portion of the additional transaction details are downloadable from a remote data source.

* * * * *